Figure 1:
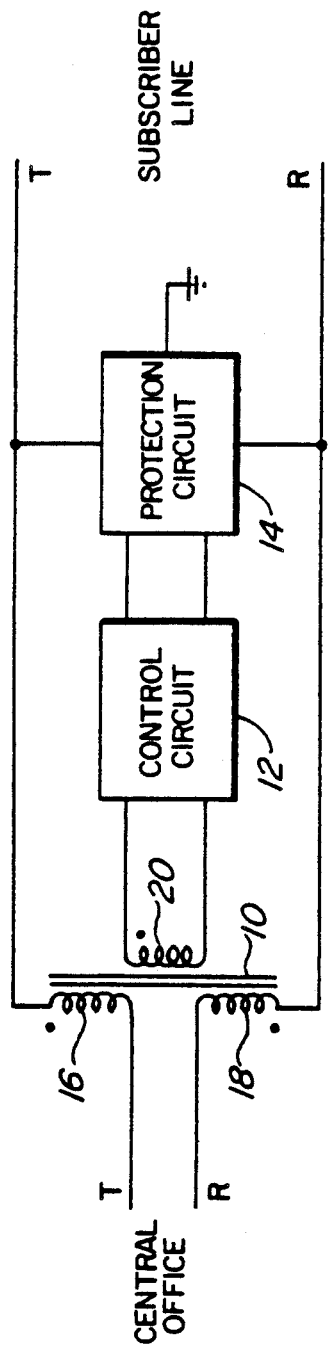

United States Patent [19]

Hung

[11] Patent Number: 4,991,051
[45] Date of Patent: Feb. 5, 1991

[54] PROTECTION ARRANGEMENTS FOR COMMUNICATIONS LINES

[75] Inventor: Francis Y. Hung, Kanata, Canada

[73] Assignee: Northern Telecom Limited, Montreal, Canada

[21] Appl. No.: 906,466

[22] Filed: Sep. 12, 1986

[51] Int. Cl.$^5$ .............................................. H02H 9/00
[52] U.S. Cl. ..................................... 361/57; 361/111; 361/119; 379/399; 379/412
[58] Field of Search ................. 361/56, 57, 111, 117, 361/118, 119, 91; 379/399, 412

[56] References Cited

U.S. PATENT DOCUMENTS

| | | | |
|---|---|---|---|
| 3,426,265 | 2/1969 | Till | 361/57 |
| 3,941,941 | 3/1976 | Simokat et al. | 379/399 |
| 4,096,363 | 6/1978 | Earp | 379/399 |
| 4,106,070 | 8/1978 | Gordon et al. | 361/42 |
| 4,156,263 | 5/1979 | Comerford et al. | 361/42 |
| 4,243,842 | 1/1981 | Gibb | 379/399 |
| 4,369,337 | 1/1983 | Parlor | 379/399 |
| 4,408,248 | 10/1983 | Bulley et al. | 361/57 |
| 4,440,980 | 4/1984 | Bakker | 361/119 |
| 4,679,115 | 7/1987 | Conan | 379/42 |
| 4,695,916 | 9/1987 | Satoh et al. | 361/119 |

Primary Examiner—A. D. Pellinen
Assistant Examiner—Jeffrey A. Gaffin
Attorney, Agent, or Firm—R. John Haley

[57] ABSTRACT

A protection arrangement for a two-wire line, such as a telephone subscriber line, includes a transformer having two primary windings and a secondary winding. The primary windings are connected in series with the wires of the line with phases such that common mode (longitudinal) currents on the line induce a current in the secondary winding, whereas loop currents do not. The induced current in the secondary winding is amplified and used to trigger a protection device, such as a triac or SCR and diode bridge arrangement, to short circuit the line for the duration of any excessive current thereon.

41 Claims, 4 Drawing Sheets

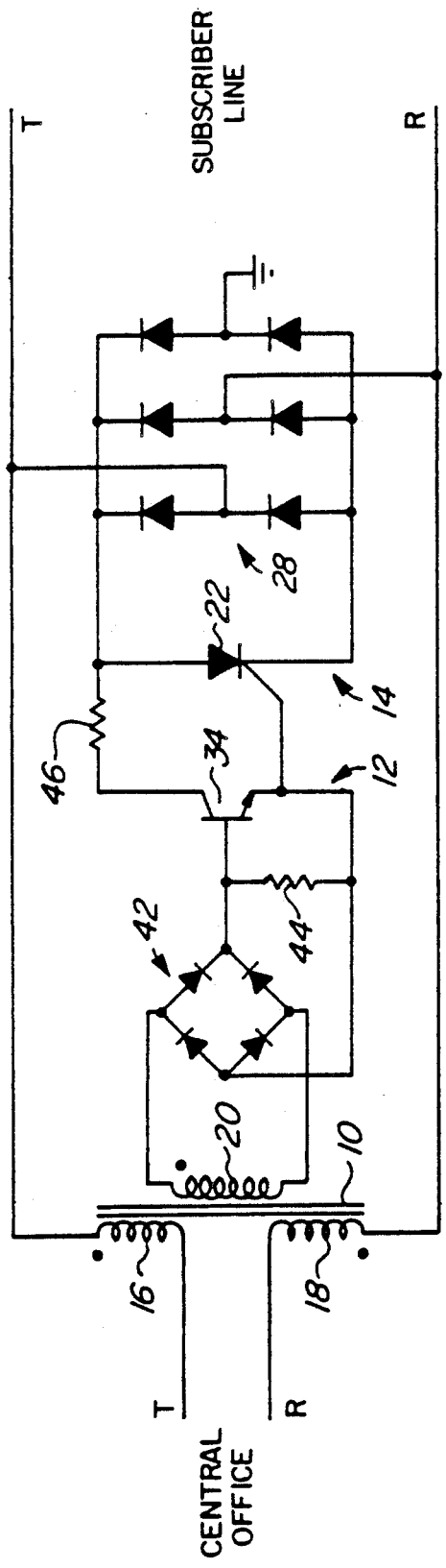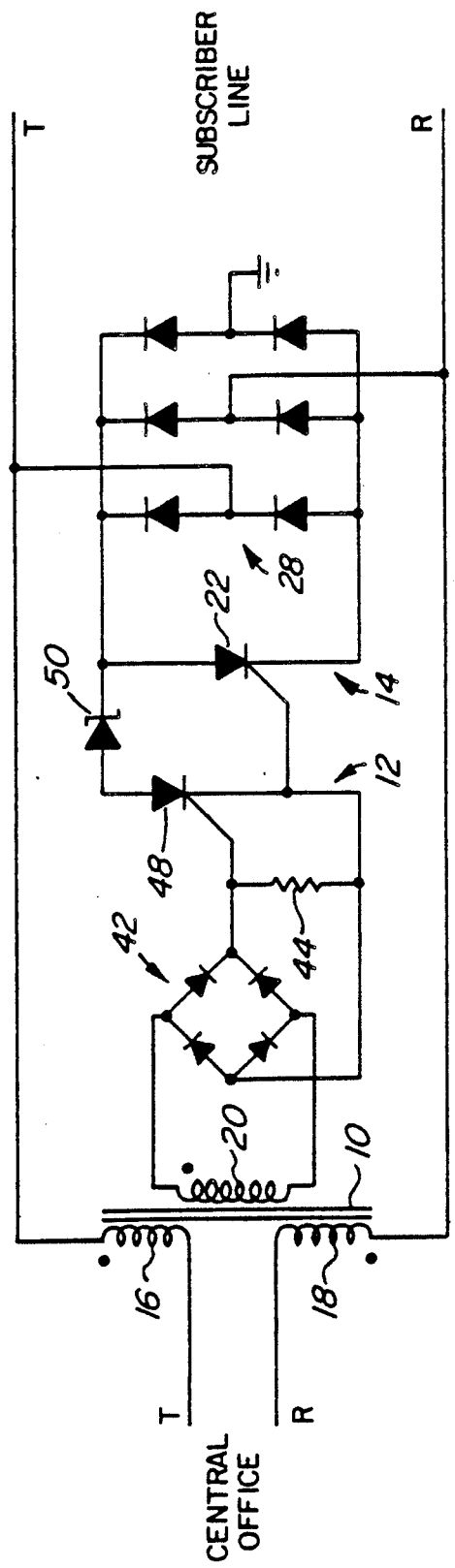

PROTECTION ARRANGEMENTS FOR COMMUNICATIONS LINES

This invention relates to protection arrangements for protecting equipment coupled to communications lines from excessive voltages and/or currents which may occur on such lines.

It has long been known to provide one or more protection devices connected to a communications line, for example a balanced two-wire telephone subscriber line, in order to protect equipment coupled to the line from excessive voltages and currents which may occur on the line. Such excessive voltages and currents may arise from lightning strikes, power line crosses, and currents induced from adjacent power lines.

Protection from surges due to lightning strikes is commonly provided by surge arresters, while protection from power line crosses and induced currents is commonly provided by so-called heat coils. The heat coil comprises two resistances, each typically of about 4 ohms, which are connected in series with the wires of the line and which serve by resistive heating in the event of a sustained excessive voltage or current to activate a thermally sensitive shorting mechanism, thereby shunting current to ground.

Such known devices introduce various well-known disadvantages or problems. For example the heat coil is not resettable, so that it must be identified and replaced after it has effected a protective operation, and because it is a thermal device it can be slow to operate. Furthermore, it introduces an undesired resistance into the line. Nevertheless, such devices continue to be used extensively for protection purposes in view of their low cost and relatively small size and the lack of economic alternatives.

Various solid state devices have been proposed for protection purposes. In particular, semiconductor transient voltage protectors have been proposed for replacing carbon block and gas tube surge arresters. Furthermore, a solid state transient overvoltage suppressor and overcurrent arrester is known, in the form of SGS device type L3100, which includes a gate or trigger electrode. This device operates in a similar manner to a semiconductor controlled rectifier, which becomes conductive either in response to an excessive voltage between its anode and cathode or in response to a voltage dropped by an excessive current flowing through a series resistor connected between its cathode and gate, and automatically resets itself (i.e. becomes non-conductive) upon removal of the excessive voltage or current. However, the need for the series resistor remains. In addition, such a protection arrangement is responsive to absolute current but can be insensitive to common mode currents (longitudinal currents flowing in the same direction on both wires of a two-wire line) and metallic currents (semi-longitudinal currents flowing on only one wire of a two-wire line) which arise from lightning strikes and power line induction.

Accordingly, a need exists for a reliable, low-cost, small size, automatically-resetting protection arrangement.

An object of this invention, therefore, is to provide an improved protection arrangement.

According to this invention there is provided a protection arrangement for connection to a two-wire line, comprising: a transformer having two similar primary windings and a secondary winding, said primary windings being arranged for connection each in series with a respective wire of the two-wire line to induce current in the secondary winding in response to common mode currents on the two-wire line and substantially to avoid inducing current in the secondary winding in response to loop current on the two-wire line; protection means for connection to the two-wire line; and control means responsive to induced current in the secondary winding of the transformer for triggering the protection means to provide a short circuit of the two-wire line in the presence of an excessive current on the line; the protection means being arranged automatically to terminate said short circuit in response to termination of said excessive current.

The control means preferably comprises: rectifying means for rectifying induced current in the secondary winding of the transformer to produce a rectified current; and amplifying means for amplifying the rectified current to produce a control current for triggering the protection means.

The protection means can comprise a unidirectionally conductive protection device and a diode bridge having two a.c. terminals for connection to the two-wire line and having two d.c. terminals coupled to the protection device. For a balanced two-wire line, such as a telephone subscriber line, the diode bridge preferably comprises six diodes and has a third a.c. terminal for connection to ground. The unidirectionally conductive protection device can comprise a semiconductor controlled rectifier or an equivalent transistor arrangement. With such an arrangement, the amplifying means is conveniently coupled to the diode bridge, preferably via a zener diode which compensates for a d.c. voltage applied across the two-wire line, for deriving current therefrom.

Alternatively, the protection means can comprise at least one bidirectionally conductive protection device, such as a triac. Advantageously for a balanced two-wire line two such devices are provided each arranged for connection between a respective wire of the two-wire line and ground, and means, for example respective current-limiting resistors, are provided which are responsive to the control means for commonly triggering the two protection devices. In this case the arrangement preferably includes diode means, such as a diode bridge, for connection to the two-wire line, the amplifying means being coupled, preferably via a zener diode as discussed above, to the diode means for deriving current therefrom.

The rectifying means can comprise full wave rectifying means, such as a diode bridge or two diodes used in conjunction with a center-tapped secondary winding. Alternatively, the rectifying means may comprise two half-wave rectifiers and the amplifier means may comprise two current amplifiers each connected to a respective half-wave rectifier for producing a control current for triggering the protection means on a respective half cycle of an induced alternating current in the secondary winding of the transformer.

The amplifying means or each current amplifier thereof preferably comprises a latching transistor current amplifier, or a semiconductor controlled rectifier which is inherently a latching device, to provide for rapid triggering of the protection means. The amplifying means may alternatively comprise a field effect transistor. In this case in particular, the control means preferably includes capacitive filtering means between the rectifying means and the amplifying means, for filtering out noise and ripples.

The invention will be further understood from the following description with reference to the accompanying drawings, in which:

FIG. 1 illustrates in a schematic and block diagrammatric form a protection arrangement in accordance with an embodiment of the invention; and FIGS. 2 to 7 are circuit diagrams representing alternative implementations of the protection arrangement of FIG. 1.

The same references are used to denote similar components in the different figures.

Referring to FIG. 1, a protection arrangement for a two-wire balanced telephone subscriber line, comprising tip and ring wires T and R respectively, is illustrated. The protection arrangement is located for example adjacent to a telephone central office containing equipment to be protected against excessive voltages and currents, due to faults such as lightning strikes, power crosses, and induced currents, on the subscriber line.

The protection arrangement comprises a transformer 10, a control circuit 12, and a protection circuit 14. The protection circuit 14 is coupled to the tip and ring wires T and R of the balanced subscriber line and to ground and serves, when triggered by the control circuit 12 or without triggering in response to a sufficiently high voltage, to short out excessive voltages and currents so that they can not damage central office equipment which is connected to the line.

The transformer 10 has two primary windings 16 and 18, which are coupled in series with the two wires T and R respectively with opposite senses or polarities as shown by dots indicating the starts of the respective transformer windings, and a secondary winding 20 which is coupled to the control circuit 12. For example each of the primary windings 16 and 18 may have 9 turns and the secondary winding 20 may have 360 turns, for an overall transformer ratio of 1:20. Each primary winding can have a d.c. resistance of about 0.5 ohm, for a total subscriber loop additional d.c. resistance of 1 ohm due to the transformer 10, which is significantly less than that (total of 8 ohms) due to heat coils in the prior art.

Such a transformer 10 can be made with a very small size. For example, using 41 gauge wire and the above numbers of turns, the transformer 10 may occupy a generally cubic volume with a size no more than about 5 mm in each direction.

Due to the opposite senses of the primary windings 16 and 18, loop curents (currents flowing in opposite directions on the wires T and R) which occur on the subscriber line during normal operation have no effect on the protection arrangement, the magnetic flux due to these currents cancelling in the transformer 10. Common mode (longitudinal) and metallic (semi-longitudinal) currents on the subscriber line, which occur due to faults against which protection is desired, however, result in a net magnetic flux in the transformer 10 producing a signal at the secondary winding 20, in response to which the control circuit 12 triggers the protection circuit 14 to effect a protective short-circuit of each of the tip and ring wires T and R to ground.

The sensitivity of the control circuit 12 and the turns ratio of the transformer 10 can be selected for particular requirements. For example, with the above turns ratio the control circuit 12 may be readily designed to respond to a current of 2.5mA from the secondary winding 20, to trigger the protection circuit 14. This corresponds to effecting protection in response to a common mode (longitudinal) current of $20 \times 2.5mA = 50mA$, or in response to a metallic (semi-longitudinal) current of $40 \times 2.5mA = 100mA$. These figures have been found to be satisfactory for normal loop current and signalling conditions, including party line ringing on short loops which provides a semi-longitudinal current of about 70mA.

FIGS. 2 to 7 illustrate various possible implementations of the control circuit 12 and protection circuit 14 which may be used.

Figure 2:
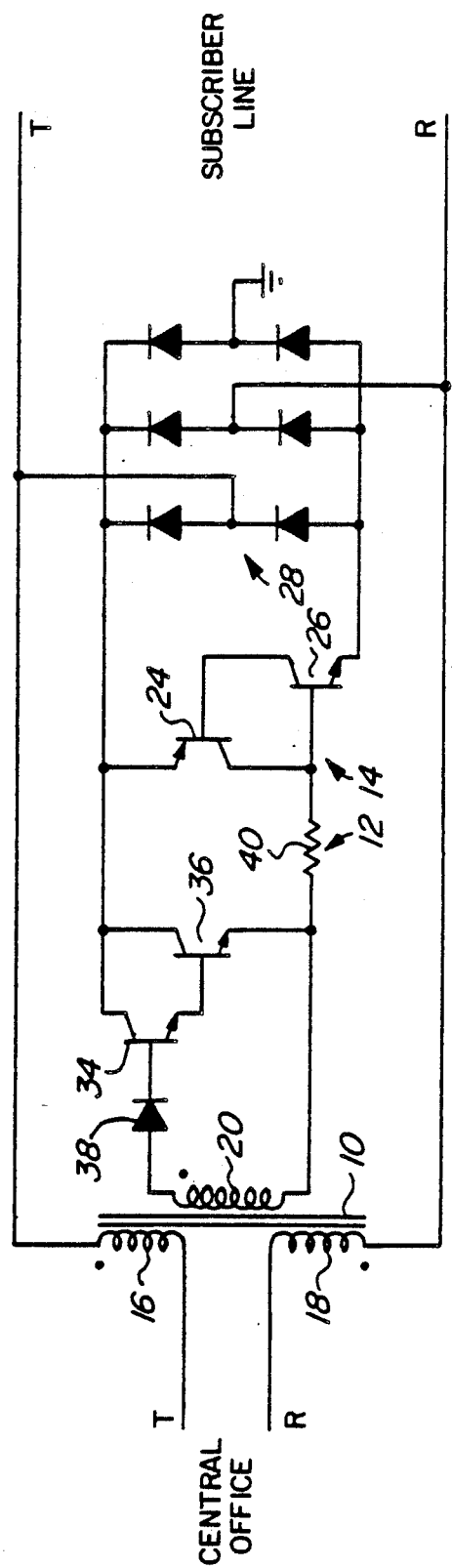
Figure 7:
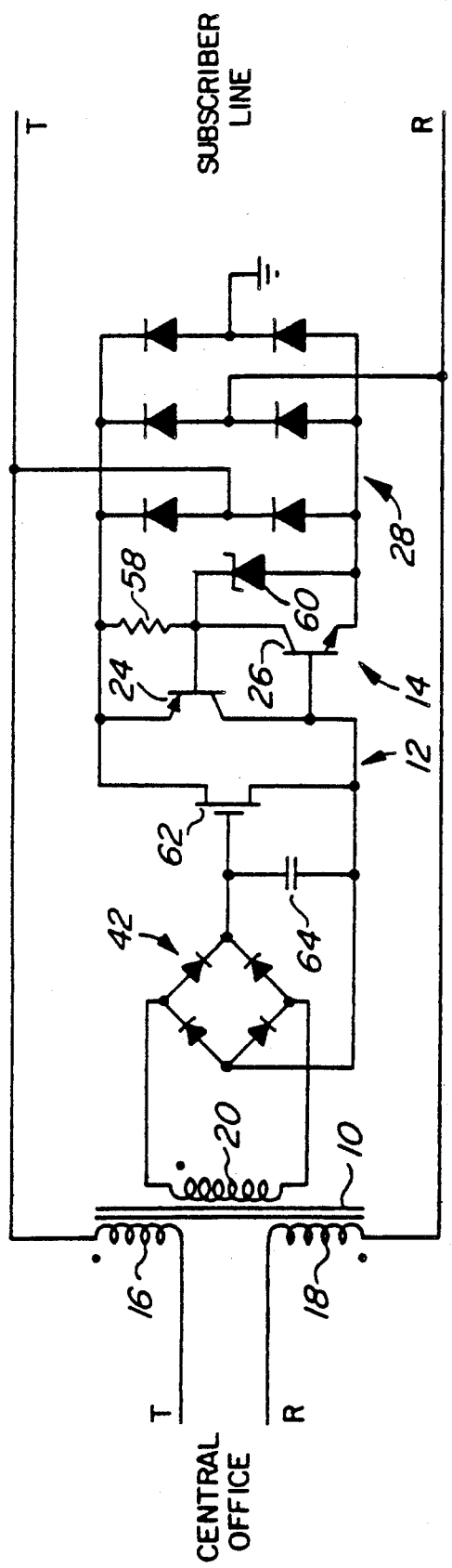

In FIGS. 2, 3, 4, and 7 the protection circuit 14 comprises a unidirectional protection device, constituted in FIGS. 3 and 4 by an SCR (semiconductor controlled rectifier) 22 and in FIGS. 2 and 7 by two transistors 24, 26 operating in an equivalent manner, which is accordingly coupled to the tip and ring wires T and R and to ground via a 6-diode bridge 28 in a manner known for example from U.S. Pat. No. 4,408,248 issued Oct. 4, 1983. The SCR must have a breakdown voltage greater than the maximum central office voltage, and a holding current greater than the maximum short-circuit current which the central office can supply. The unidirectional protection device could alternatively be constituted by the SGS device type L3100 already referred to. In contrast, in FIGS. 5 and 6 the protection circuit comprises two bidirectional protection devices, constituted by triacs 30, 32, each connected between a respective one of the tip and ring wires T and R and ground, the diode bridge 28 in this case not being required.

The control circuit 12 may conceivably comprise a direct connection or a diac between the secondary winding 20 and the protection device, if the latter is sufficiently sensitive and the transformer 10 is sufficiently large to supply the necessary current for triggering the protection device. In general this will not be the case in practice, in which case the control circuit 12 may comprise a rectifying and current amplifying arrangement examples of which are illustrated in FIGS. 2 to 7.

In FIG. 2 the control circuit 12 comprises two transistors 34, 36 connected in a Darlington configuration for amplifying current from the secondary winding 20, rectified by a diode 38, to supply a suitable drive current via a resistor 40 to the protection device. The resistance of the resistor 40, in conjunction with the gain of the transistors, determines the threshold at which the protection device is triggered.

In the arrangement of FIG. 2 the protection device can only be triggered on one half-cycle of an a.c. fault waveform. This disadvantage can be avoided by replacing the single diode 38 with a diode bridge 42 as shown in FIG. 3, whereby the protection device can be triggered during either half-cycle of an a.c. fault waveform. In addition, the control circuit 12 of FIG. 3 uses only a single transistor 34 as a current amplifier, together with resistors 44 and 46.

The control circuit 12 of FIG. 4 is similar to that of FIG. 3 except that an SCR 48 is used in place of the transistor 34 to provide the required drive current for the protection SCR 22. In addition, FIG. 4 illustrates that the resistor 46 can be replaced by a zener diode 50, which for example may be a 60 volt zener diode for a conventional arrangement in which a central office battery voltage of −48 volts is coupled to the ring wire R. In this case, an excess voltage of only about 12 volts on the subscriber line is sufficient to forward bias the SCR 48, whereby it can be fired to trigger the protection device in the event of an excessive current against which protection is desired. Thus the zener diode 50 serves to compensate in the control circuit 12 for the central office battery voltage which is applied to the subscriber line.

Figure 5:
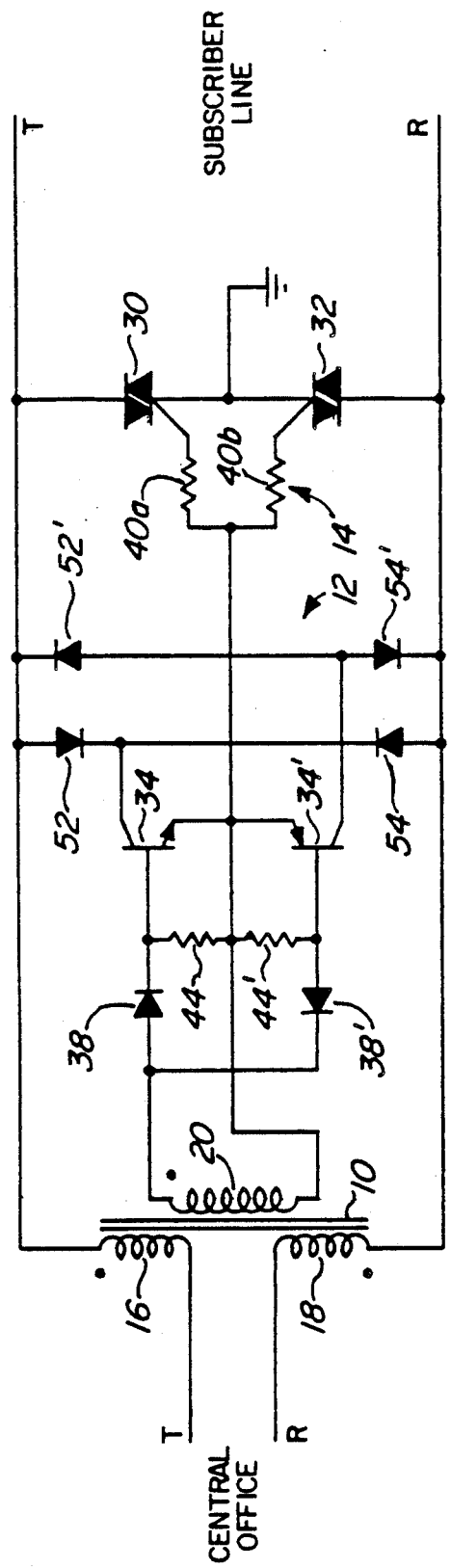
Figure 6:
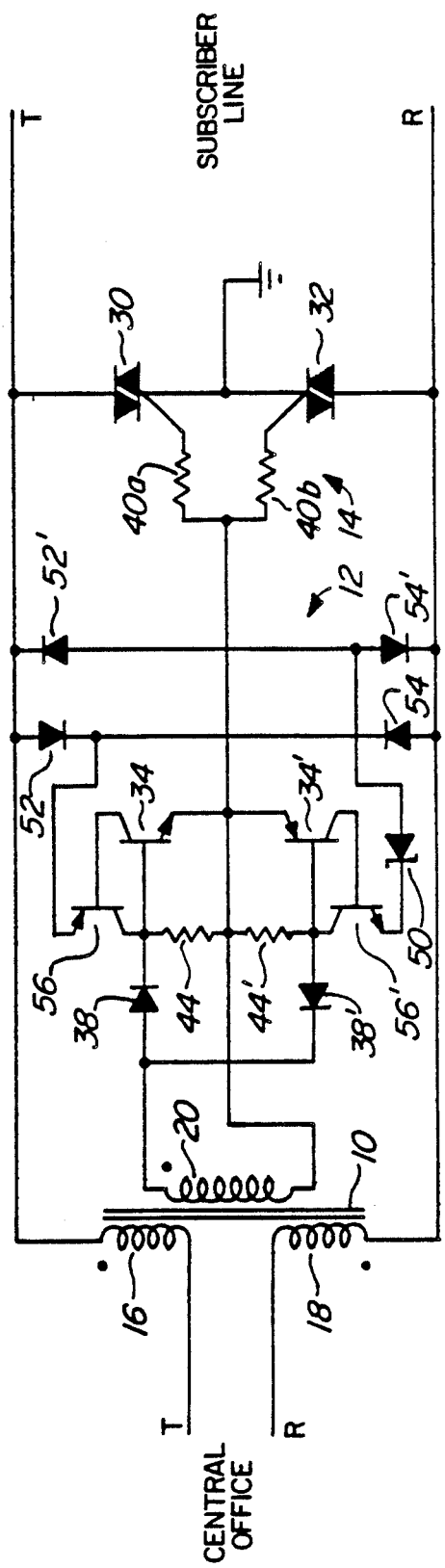

As an alternative to the provision of the diode bridge 42, in FIGS. 5 and 6 the control circuit 12 is divided into two complementary halves which operate on respective half-cycles of an a.c. fault waveform on the subscriber line, the two halves being referenced similarly but with respectively normal and primed numbers (e.g. 34 and 34').

In FIG. 5 the diode 38, resistor 44, and transistor 34 operate, with bias current supplied from the subscriber line via a diode 52 or 54, on one half-cycle of an a.c. fault waveform to trigger both triacs 30 and 32, via respective current-limiting resistors 40a and 40b, in the event of an excessive current during that half-cycle. The corresponding components 38', 44', 34', 52', and 54' operate in a similar manner during the other half-cycle, again to trigger both triacs in the event of an excessive current.

The control circuit 12 in FIG. 6 is similar to that of FIG. 5, except that it includes additional latching transistors 56, 56' for achieving a more rapid triggering of the protection circuit 14, and a zener diode 50 as described above for compensating for the central office battery voltage applied to the subscriber line.

In FIG. 7, the protection circuit 14 is similar to that of FIG. 2 in that it comprises two transistors 24, 26 constituting a unidirectional protection device and a 6-diode bridge 28, but it additionally includes a holding current control resistor 58 and an optional zener diode 60 to provide a fail-safe protection against excessive subscriber line voltages. In the control circuit 12 of FIG. 7 a diode bridge 42 is provided in the same manner as in FIGS. 3 and 4, but a MOSFET (metal oxide semiconductor field effect transistor) 62 is used, instead of a bipolar transistor or SCR, to trigger the protection device. The MOSFET 62 may be a high voltage, N channel, enhancement type transistor, with the advantage that the arrangement can be used for different and higher central office battery voltages, for example up to 135 volts.

In addition, in FIG. 7 a capacitor 64 is connected between the gate and source of the MOSFET 62 to filter out ripples and noise which could otherwise cause false triggering of the protection device. As the MOSFET 62 has a high gate-to-source leakage resistance the capacitor 64 can have a small capacitance, of the order of tens of picofarads, which can easily be implemented in an integrated circuit form or can be constituted by the gate-to-source capacitance of the MOSFET 62 itself.

From the foregoing description it should be appreciated that protection arrangements in accordance with the invention can provide a large number of advantages in comparison to the prior art.

In particular, protection can be achieved against excessive currents rapidly within each half-cycle of an a.c. fault waveform, without oscillation and with automatic resetting on removal of the excessive current, in dependence upon an overcurrent threshold level which can be selected as desired by appropriate design of the transformer and control circuit and which is relatively insensitive to temperature changes. The slow response of thermal devices such as heat coils is avoided. The rapid response and sensitivity of the protection arrangement enables the protection device to be triggered at an early part of the half-cycle of an a.c. fault waveform, whereby the rate of change of current upon such triggering is much smaller than occurs, for example, with carbon block or gas filled protection devices of the prior art. This considerably reduces noise levels in adjacent subscriber lines in a central office.

In addition, the lowered d.c. resistance of the transformer primary windings in comparison to the d.c. resistance of heat coils provides significant benefits, and matching of the windings is relatively easily controlled. Partly as a result of this, the protection arrangement has a substantially flat frequency response up to a frequency of at least 1.544MHz, so that it can be used on high-speed digital transmission lines as well as voice frequency telephone subscriber lines.

Furthermore, the protection arrangement, except for the transformer which can be of very small size and low cost, can be integrated in a single semiconductor integrated circuit whereby it can be produced in a small size and at low cost.

Although particular embodiments of the invention have been described in detail above, it should be appreciated that numerous other variations, modifications, and adaptations may be made thereto without departing from the scope of the invention as defined in the claims.

What is claimed is:

1. A protection arrangement comprising:
   a transformer having two similar primary windings and a secondary winding, said primary windings having corresponding ends with respect to which currents flowing in the same direction in the two primary windings induce current in the secondary winding and equal currents flowing in opposite directions in the two primary windings substantially do not induce current in the secondary winding;
   protection means connected between said corresponding ends to the two primary windings; and
   control means responsive to induced current in the secondary winding of the transformer for triggering the protection means to provide a short circuit in the presence of excessive currents flowing in the same direction in the two primary windings;
   the protection means being arranged automatically to terminate said short circuit in response to termination of said excessive currents.

2. A protection means as claimed in claim 1 wherein the protection means comprises a unidirectionally conductive protection device and a diode bridge having two a.c. terminals connected to the corresponding ends of the primary windings and having two d.c. terminals coupled to the protection device.

3. A protection arrangement as claimed in claim 2 wherein the diode bridge comprises six diodes and has a third a.c. terminal for connection to ground.

4. A protection arrangement as claimed in claim 2 wherein the unidirectionally conductive protection device comprises a semiconductor controlled rectifier.

5. A protection arrangement as claimed in claim 1 wherein the protection means comprises at least one bidirectionally conductive protection device.

6. A protection arrangement as claimed in claim 5 wherein the protection means comprises two bidirectionally conductive protection devices each connected to a respective one of the primary windings and arranged for connection to ground, and means responsive to the control means for commonly triggering the two protection devices.

7. A protection arrangement as claimed in claim 6 wherein each bidirectionally conductive protection device comprises a triac.

8. A protection arrangement as claimed in claim 1 wherein the control means comprises:
rectifying means for rectifying induced current in the secondary winding of the transformer to produce a rectified current; and
amplifying means for amplifying the rectified current to produce a control current for triggering the protection means.

9. A protection arrangement as claimed in claim 8 wherein the protection means comprises a unidirectionally conductive protection device and a diode bridge having two a.c. terminals connected to the corresponding ends of the primary windings and having two d.c. terminals coupled to the protection device.

10. A protection arrangement as claimed in claim 9 wherein the amplifying means is coupled to the diode bridge for deriving current therefrom.

11. A protection arrangement as claimed is claim 10 wherein the amplifying means is coupled to the diode bridge via a zener diode.

12. A protection arrangement as claimed in claim 8 wherein the protection means comprises at least one bidirectionally conductive protection device.

13. A protection arrangement as claimed in claim 12 and including diode means connected to the primary windings, wherein the amplifying means is coupled to the diode means for deriving current therefrom.

14. A protection arrangement as claimed in claim 13 wherein the amplifying means is coupled to the diode means via a zener diode.

15. A protection arrangement as claimed in claim 13 wherein the diode means comprises a diode bridge.

16. A protection arrangement as claimed in claim 8 wherein the rectifying means comprises full wave rectifying means.

17. A protection arrangement as claimed in claim 8 wherein the rectifying means comprises two half-wave rectifiers and the amplifying means comprises two current amplifiers each connected to a respective half-wave rectifier producing a control current triggering the protection means on a respective half cycle of an induced alternating current in the secondary winding of the transformer.

18. A protection arrangement as claimed in claim 17 wherein each current amplifier comprises a latching transistor current amplifier.

19. A protection arrangement as claimed in claim 8 wherein the amplifying means comprises a transistor current amplifier.

20. A protection arrangement as claimed in claim 8 wherein the amplifying means comprises a latching transistor current amplifier.

21. A protection arrangement as claimed in claim 8 wherein the amplifying means comprises a semiconductor controlled rectifier.

22. A protection arrangement as claimed in claim 8 wherein the amplifying means comprises a field effect transistor.

23. A protection arrangement as claimed in claim 22 wherein the control means includes capacitive filtering means between the rectifying means and the amplifying means.

24. A protection arrangement as claimed in claim 8 wherein the control means includes capacitive filtering means between the rectifying means and the amplifying means.

25. A protection arrangement comprising:
a transformer having first and second similar primary windings and a secondary winding;
triggerable protection means coupled directly between corresponding ends of the first and second primary windings; and
control means coupled between the secondary winding and the protection means for triggering the protection means, in response to induced alternating current in the secondary winding, to provide a short circuit between said corresponding ends of the first and second primary windings;
the protection means being arranged automatically to terminate said short circuit upon termination of the triggering.

26. A protection arrangement as claimed in claim 25 wherein the protection means comprises a unidirectionally conductive protection device and a diode bridge, the diode bridge having two a.c. terminals connected to said corresponding ends of the primary windings and having two d.c. terminals coupled to the protection device.

27. A protection arrangement as claimed in claim 26 wherein the diode bridge comprises six diodes and has a third a.c. terminal for connection to ground.

28. A protection arrangement as claimed in claim 25 wherein the protection means comprises at least one bidirectionally conductive protection device.

29. A protection arrangement as claimed in claim 28 wherein the protection means comprises two bidirectionally conductive protection devices each connected to a respective one of the primary windings and arranged for connection to ground, and means responsive to the control means for commonly triggering the two protection devices.

30. A protection arrangement as claimed in claim 25 wherein the control means comprises:
rectifying means for rectifying induced current in the secondary winding of the transformer to produce a rectified current; and
amplifying means for amplifying the rectified current to produce a control current for triggering the protection means.

31. A protection arrangement as claimed in claim 30 wherein the protection means comprises a unidirectionally conductive protection device and a diode bridge, the diode bridge having two a.c. terminals connected to said corresponding ends of the primary windings and having two d.c. terminals coupled to the protection device.

32. A protection arrangement as claimed in claim 31 wherein the amplifying means is coupled to the diode bridge for deriving current therefrom.

33. A protection arrangement as claimed in claim 32 wherein the amplifying means is coupled to the diode bridge via a zener diode.

34. A protection arrangement as claimed in claim 30 wherein the protection means comprises at least one bidirectionally conductive protection device.

35. A protection arrangement as claimed in claim 34 and including diode means connected to said corresponding ends of the primary windings, wherein the amplifying means is coupled to the diode means for deriving current therefrom.

36. A protection arrangement as claimed in claim 35 wherein the amplifying means is coupled to the diode means via a zener diode.

37. A protection arrangement as claimed in claim 35 wherein the diode means comprises a diode bridge.

38. A protection arrangement as claimed in claim 30 wherein the rectifying means comprises full wave rectifying means.

39. A protection arrangement as claimed in claim 30 wherein the rectifying means comprises two half-wave rectifiers and the amplifying means comprises two current amplifiers each connected to a respective half-wave rectifier for producing a control current for triggering the protection means on a respective half cycle of an induced alternating current in the secondary winding of the transformer.

40. A protection arrangement as claimed in claim 30 wherein the control means includes capacitive filtering means between the rectifying means and the amplifying means.

41. A two-wire line and a protection arrangement therefor, the protection arrangement comprising:
 a transformer having two similar primary windings and a secondary winding, said primary windings being connected each in series with a respective wire of the two-wire line to induce current in the secondary winding in response to common mode currents on the two-wire line and substantially to avoid inducing current in the secondary winding in response to loop current on the two-wire line;
 triggerable protection means connected to the two-wire line; and
 control means responsive to induced current in the secondary winding of the transformer for triggering the protection means to provide a short circuit of the two-wire line in the presence of an excessive current on the line;
 the protection means being arranged automatically to terminate said short circuit upon termination of the excessive current on the line.

* * * * *